US006983382B1

(12) United States Patent
Hartke et al.

(10) Patent No.: US 6,983,382 B1
(45) Date of Patent: Jan. 3, 2006

(54) METHOD AND CIRCUIT TO ACCELERATE SECURE SOCKET LAYER (SSL) PROCESS

(75) Inventors: Paul Hartke, Stanford, CA (US); Craig Robson, Sunnyvale, CA (US); Syrus Ziai, 1762 Heron Ave., Sunnyvale, CA (US) 94087; Greg Grohoski, Austin, TX (US)

(73) Assignee: Syrus Ziai, Sunnyvale, CA (US)

( * ) Notice: Subject to any disclaimer, the term of this patent is extended or adjusted under 35 U.S.C. 154(b) by 687 days.

(21) Appl. No.: 09/900,277

(22) Filed: Jul. 6, 2001

(51) Int. Cl.
  *H04L 9/00* (2006.01)
  *G06F 15/16* (2006.01)
(52) U.S. Cl. .................. 713/201; 713/167; 713/193; 713/200; 380/201; 709/229
(58) Field of Classification Search ............... 713/151, 713/152, 160, 201

See application file for complete search history.

(56) References Cited

U.S. PATENT DOCUMENTS

| 6,070,198 A * | 5/2000 | Krause et al. ............... 719/321 |
| 6,338,139 B1 * | 1/2002 | Ando et al. ................. 713/168 |
| 6,374,402 B1 * | 4/2002 | Schmeidler et al. ........ 717/167 |
| 6,421,781 B1 * | 7/2002 | Fox et al. .................... 713/201 |
| 6,446,192 B1 * | 9/2002 | Narasimhan et al. ......... 712/29 |
| 6,738,874 B2 * | 5/2004 | Zsohar ....................... 711/157 |

* cited by examiner

*Primary Examiner*—Kambiz Zand
(74) *Attorney, Agent, or Firm*—Blakely, Sokoloff, Taylor & Zafman, LLP

(57) ABSTRACT

Methods and apparatus' for performing SSL processing on an IP packet being transmitted onto a network and being received from a network are described. The methods and apparatus' further described performing SSL processing inline which results in a reduced number of transfers over the system bus, reduced utilization of system memory, and a reduced utilization of the system CPU. An IP packet that requires SSL processing enters an acceleration device. SSL processing is performed at the acceleration device without first sending the IP packet to system memory for processing.

3 Claims, 11 Drawing Sheets

DETAILED DEPICTION OF AN EMBODIMENT

EXISTING SSL ACCELERATION DEVICES

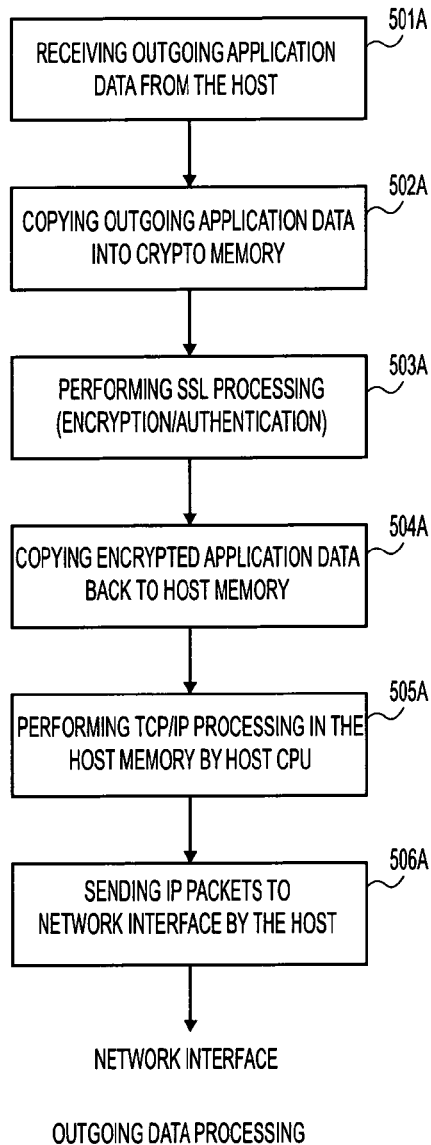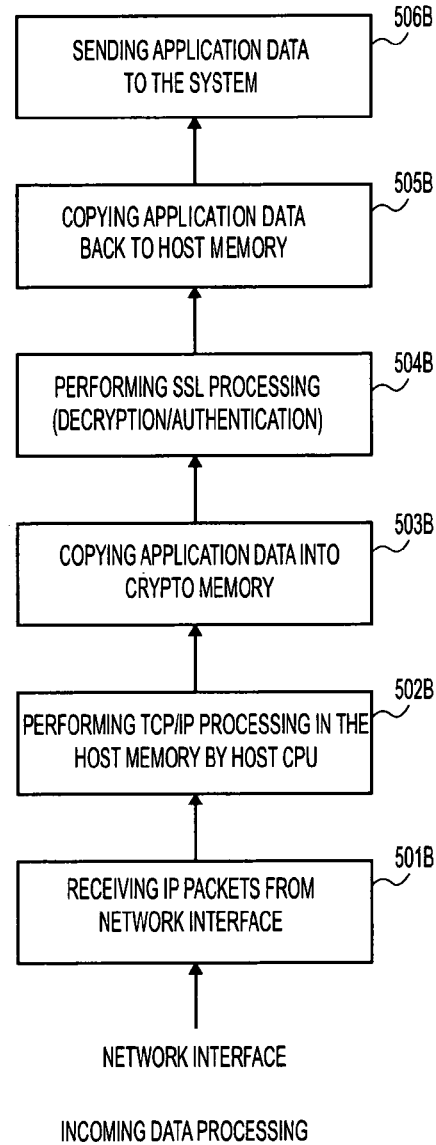
FIG. 5A
(PRIOR ART)
FIG. 5B
(PRIOR ART)

SSL ACCELERATION DEVICES

DETAILED DEPICTION OF AN EMBODIMENT

SSL ACCELERATION DEVICES

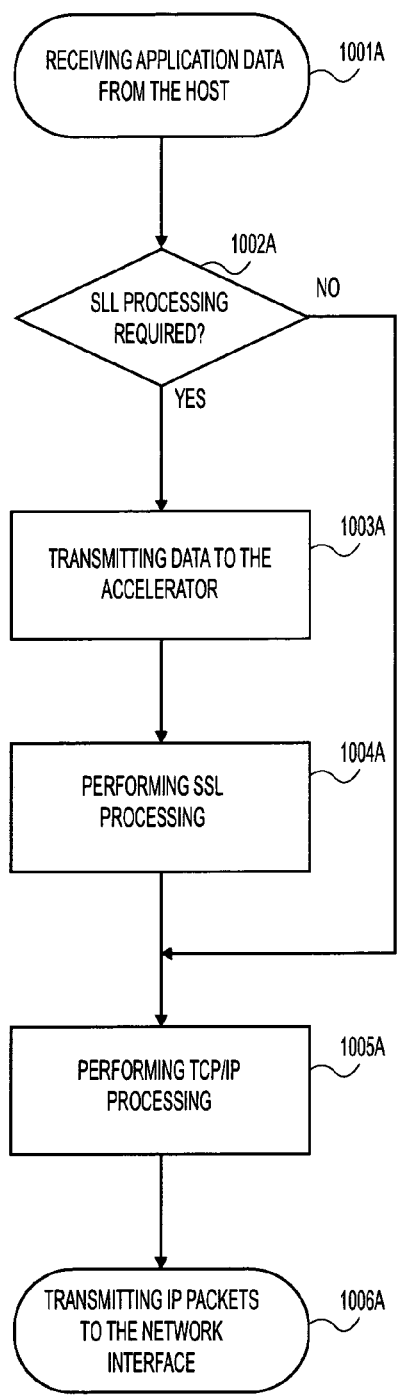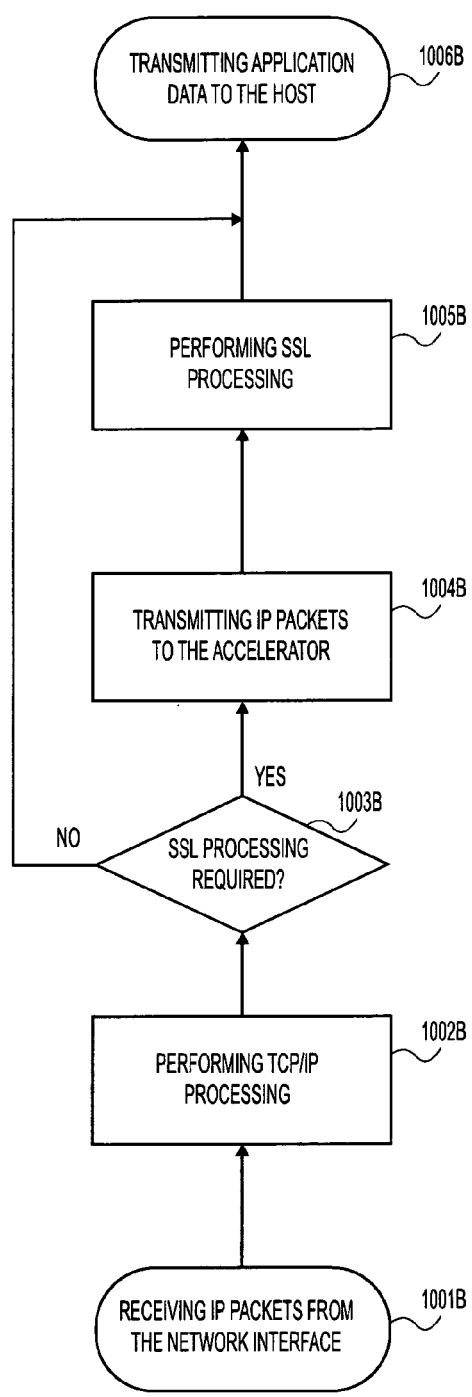
OUTGOING DATA PROCESS
INCOMING DATA PROCESS
FIG. 10A
FIG. 10B

DETAILED DEPICTION OF AN EMBODIMENT

METHOD AND CIRCUIT TO ACCELERATE SECURE SOCKET LAYER (SSL) PROCESS

FIELD OF THE INVENTION

The field of the invention relates to encryption/decryption technology, generally. More specifically, the field of invention relates to Secure Socket Layer of the TCP/IP network protocol stack.

BACKGROUND OF THE INVENTION

In recent years, network bandwidth has been increasing much faster than the speed of processing systems, such as computer systems and other systems that communicate with such networks. Increases in network bandwidth have been a result of new technologies and standards for both wide area networks (WANs) as well as for local area networks (LANs). WAN technologies such as SONET (synchronous optical networks) using DWDM (dense wavelength division multiplexing) have resulted in several orders of magnitude increase in available bandwidth over the span of only a few years. Similarly, LAN technologies such as gigabit Ethernet and ten gigabit Ethernet on copper and optical fiber have increased available network bandwidth by two orders of magnitude relative to standard 10- and 100-megabit Ethernet standards. During the same time period, the computational power of computers and other systems has been doubling about every 18 months. Because of the disparity between the processing speed of communication chips and the bandwidth of underlying network technologies to which they connect, many devices attached to networks cannot exploit the full bandwidth of the network because of the lack of processing power of these devices.

FIG. 1 shows an example of a local area network. The devices on the local network can include general purpose computers, such as computers 101a, 101b, and 101c, as well as storage devices such as network storage devices 102a and 102b, as well as appliances for performing specialized functions, such as data caching and load balancing or other custom processing (see specialized appliances 103a and 103b). The actual communication path, whether by copper wire, optical fiber or wireless, can be implemented in a variety of topologies, such as switches, rings, or buses such as the bus 104 shown for the local area network 105. The local area network typically also includes a link 106 which may be a gateway system to other networks, such as the Internet.

The most common implementation of a local area network in use today is TCP/IP on Ethernet (or IEEE 802.3). TCP is a reliable, connection oriented stream protocol that runs on top of IP, which is a packet-based protocol. UDP is a datagram-oriented protocol running on top of IP. Thus, processing systems, such as computer systems in a computer network typically transmit information over the network in the form of packets. A number of different packet based protocols have been defined to enable interconnected network computers to communicate with each other. Generally, the network protocol requires each processing system connected to the network to check, process and route information contained in each packet.

An application program which is executing on a computer (an example of a host system), such as a general purpose computer which is coupled to the network, may need to send data to another device on the network. A common way is for the application program to make a call to a network protocol stack socket interface, which calls the TCP/IP and the Ethernet drivers. Data is encapsulated first by a TCP (Transmission Control Protocol) header, subsequently by an IP (Internet Protocol) header, and lastly by an Ethernet header as shown in FIG. 2. The application data 201 may be text or graphics or a combination of text and graphics or video/motion pictures or other types of data. As shown in FIG. 2, the TCP header 202 is appended to the application data 101 and then the IP header 203 is appended to the combination of the application data 201 and the TCP header 202. Finally, the Ethernet driver appends an Ethernet header 204 and an Ethernet trailer 205. After the Ethernet driver has completed the encapsulation process, the entire packet (containing 201, 202, 203, 204, and 205) is transmitted over the communication medium of the network, which may be a copper wire, optical fiber, or wireless or other communication media to another device which is coupled to the network. The receiving device goes through the reverse sequence.

Much of the information transmitted across the internet according to the Transmission Control Protocol/Internet Protocol (TCP/IP) is vulnerable to eavesdropping and tampering. Any system connected to the internet may intercept, replay or reproduce an IP packet. There has thus been a growing demand to protect internet transmissions, while using the existing infrastructure. Secure Socket Layer (SSL), is a security protocol which was developed by Netscape Communications to compensate for the lack of data protection then in place on the Internet. SSL can be used for any type of Internet service, whether it is FTP, GOPHER, NNTP (USENET News) or Web, but currently its most popular use is for World Wide Web traffic. Further detailed information concerning the SSL specification can be found on Netscape Communications' web site at http://home.netscape.com/eng/ss13/. Recently, SSL has been enhanced and replaced by Transport Layer Security (TLS) developed by the Internet Engineering Task Force (IETF). Further detailed information concerning the development of TLS can be found on IETF's web site at http://www.ietf.org.

SSL allows a user to send and receive information to other entities on the World Wide Web in an encrypted manner. This means that any information (pictures, text, forms, etc.) that is transmitted from a server to an SSL-capable Web browser will be completely encrypted. Thus, while the data may travel across 20 or 30 networks, nobody will be able to read or tamper with the data the user is sending or receiving.

SSL is an enhancement to the TCP/IP suite of network protocol for secure communication between two devices. As shown in FIG. 3, an SSL header 306 may be included in the header field 300. Various communication protocol headers, such as an Ethernet header 304, may also be added. The TCP header 302 handles the flow of application data between two systems. The IP header 303 helps determine the path according to which data is moved around in the network.

Secure communication involves adding a Message Authentication Code (MAC) 307 to the application data 301 and then encrypting the application data and MAC using a symmetric cipher. To establish a secure connection, the client device opens a normal TCP/IP connection to the server on a special port. After this connection is established, the client and server exchange handshake messages that establish the methodology for key exchanges and data transfer between the two devices. Once a pair of keys is exchanged, both devices send data over that particular connection as encrypted and authenticated data. Exchanges of keys can be done through several protocols. In some situations, there is no key exchanged at all.

Each receiving system maintains a TCP table. The TCP table contains the source IP address, destination IP address, source port and destination port, and other information. These information are encapsulated in the TCP/IP header when a TCP/IP connection is established. After a TCP/IP connection is established each receiving system and sending system stores the above information in its TCP table. A secure connection can be requested by a sending system, specifying a secure destination port (e.g., port 443 for web server requests, while a normal connection is port 80). Based on this information, the receiving system knows the connection being established is a secure connection. Further determination of whether SSL processing is required can also be based on the secure destination port.

When a device desires to send SSL encrypted/authenticated data to the network, the application communicates with the SSL library. With the standard keys generated during the connection handshaking, the SSL library partitions the data into SSL Records and authenticates/encrypts each SSL Record. It then passes each Record to the TCP layer and subsequently to the IP layer for IP encapsulation function and final transmittal to the Ethernet interface. The receiving device goes through a similar sequence in reverse order.

Referring to FIG. 4, to accomplish SSL encryption, decryption, or authentication the acceleration device 402 uses various known algorithms (DES, RC4, MD5, SHA-1, etc.). These algorithms are computationally intense. Custom circuits optimized to accelerate computation have been developed to enhance the SSL process. Such circuits can achieve 1–2 orders of magnitude higher computational throughput as compared to a typical microprocessor's Arithmetic Logic Unit (ALUs) configured to perform the encryption or decryption in software. The acceleration device 402 shown in the system 400 of FIG. 4, is an example of such an acceleration device.

In conventional implementations, SSL and TCP/IP are distinct modules that operate on the application data sequentially. Due to its complexity, TCP/IP stack processing is often restricted to the host CPU. A problem with the scheme in FIG. 4, is the memory bandwidth and system interconnect bandwidth required to move data between its storage location 401 and the acceleration device 402. In devices such as the one shown in FIG. 4, system cpu/chipset 404 (e.g., a Pentium microprocessor and its associated chipset) dispatches outgoing application data from system memory 401 to the acceleration device 402. The acceleration device 402 then encrypts/authenticates the data and sends it back to the system cpu/chipset 404 for processing/addition of the IP and TCP headers 303, 302 (as seen in FIG. 3) and delivery of the IP packets 311 to the network interface for final transmission. Outgoing data processing path as discussed above is illustrated in FIG. 5a. Packet reception is analogous but in the reverse order as shown in FIG. 5b. As a result, system resources are heavily involved and it leaves fewer resources available for other tasks. Thus, a more efficient system is desired.

SUMMARY OF THE INVENTION

Method and apparatus for accelerating SSL processing by minimizing usage of the system resources are described herein. An aspect of the invention focuses on the architecture/method and circuits used to perform the SSL processing by minimizing the bandwidth used in various system resources (DRAM bandwidth, system bus bandwidth, etc.). Decreasing system bandwidth utilization for SSL processing acceleration leaves more bandwidth for the system to perform other tasks.

BRIEF DESCRIPTION OF THE DRAWINGS

The present invention is illustrated by way of example and not limitation in the figures of the accompanying drawings in which like references indicate similar elements.

FIG. 5a shows a method processing outgoing data used by FIG. 4.

FIG. 5b shows a method processing incoming data used by FIG. 4.

FIG. 10a shows a method processing outgoing data used by FIG. 9.

FIG. 10b shows a method processing incoming data used by FIG. 9.

DETAILED DESCRIPTION

The subject of the invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well-known or conventional details are not described in order to not unnecessarily obscure the present invention in detail.

The present discussion describes an approach that saves bandwidth within a receiving system or a transmitting system. It reduces the chance of a receiving system or a transmitting system with a connection to a high bandwidth network, such as a gigabit Ethernet, from having its various system interconnects or components act as a bottleneck. A bottleneck results in a slowing or lessening of the throughput of a receiving system or transmitting system.

Figure 6:
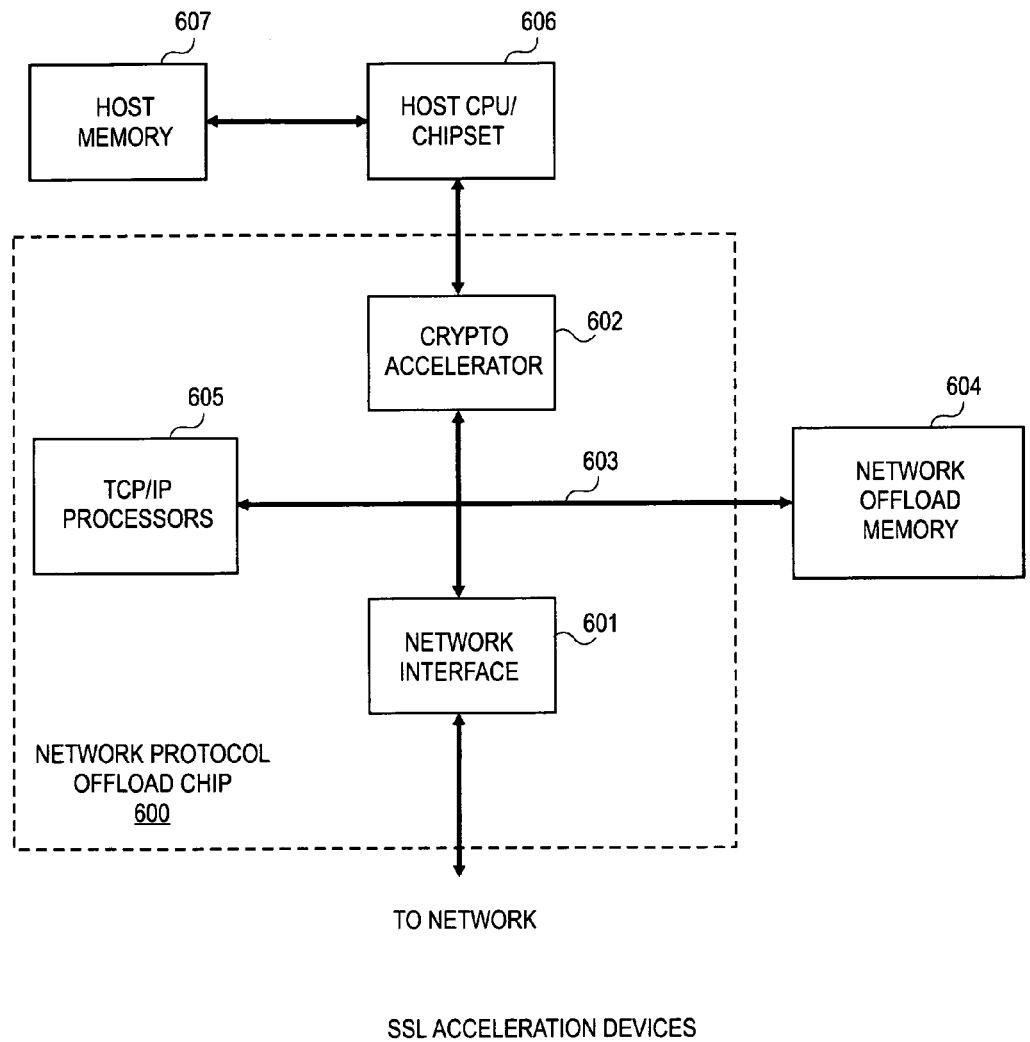
FIG. 6 shows one embodiment of an architecture to perform SSL processing.
Figures 7A, 7B:
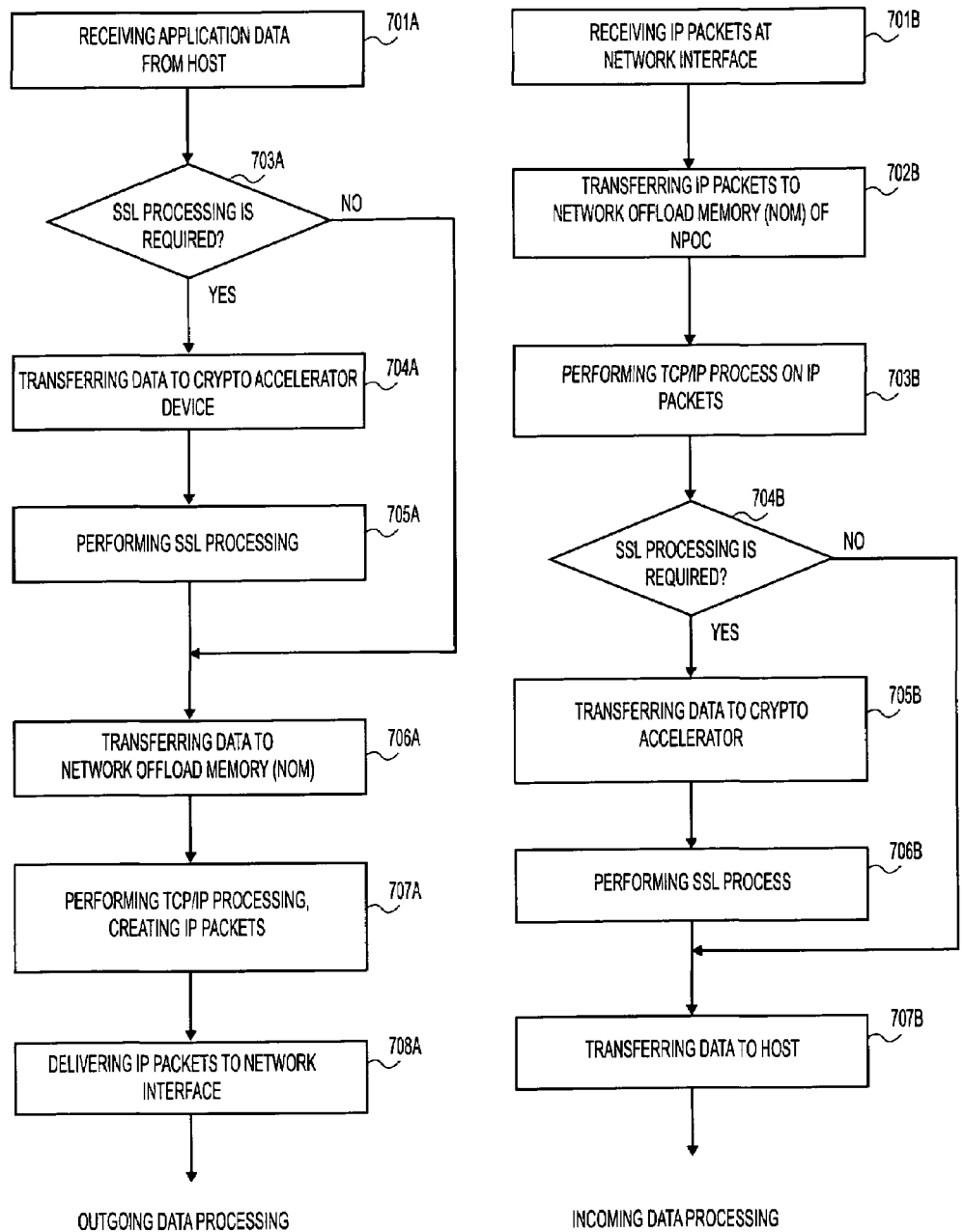
FIG. 7a shows a method processing outgoing data used by FIG. 6.
FIG. 7b shows a method processing incoming data used by FIG. 6.

FIG. 6 shows an embodiment of architecture for a receiving system or a transmitting system according to one embodiment of the invention. A corresponding embodiment of a method for performing SSL processing on an outbound SSL packet is shown in FIG. 7a. A corresponding embodiment of a method for performing SSL processing on an inbound SSL packet is shown in FIG. 7b. Further detailed information concerning an architecture for receiving or transmitting network data can be found in the U.S. copending application Ser. No. 09/841,943, filed Apr. 24, 2001 and entitled Methods and Systems for Processing Network Data, by Tung Nguyen, et al., which application is hereby incorporated by reference.

Figure 1:
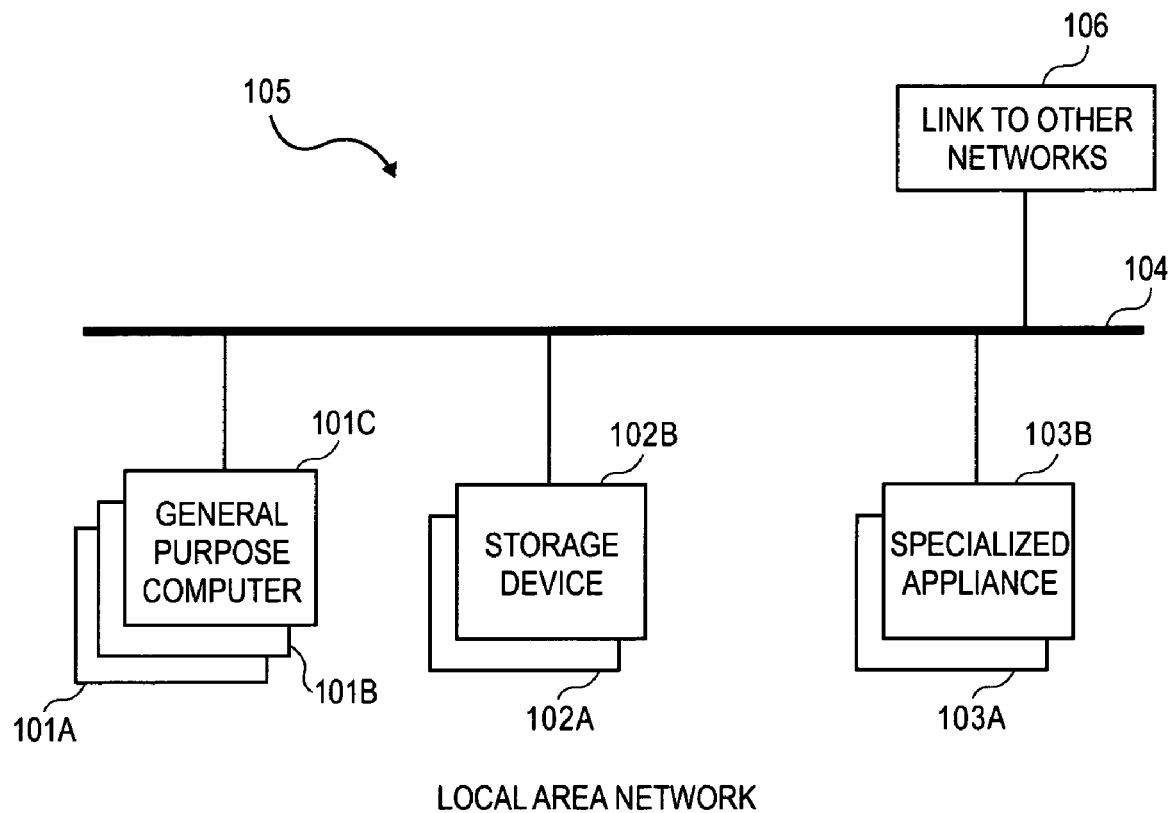
FIG. 1 shows an example of a local area network.
Figure 2:
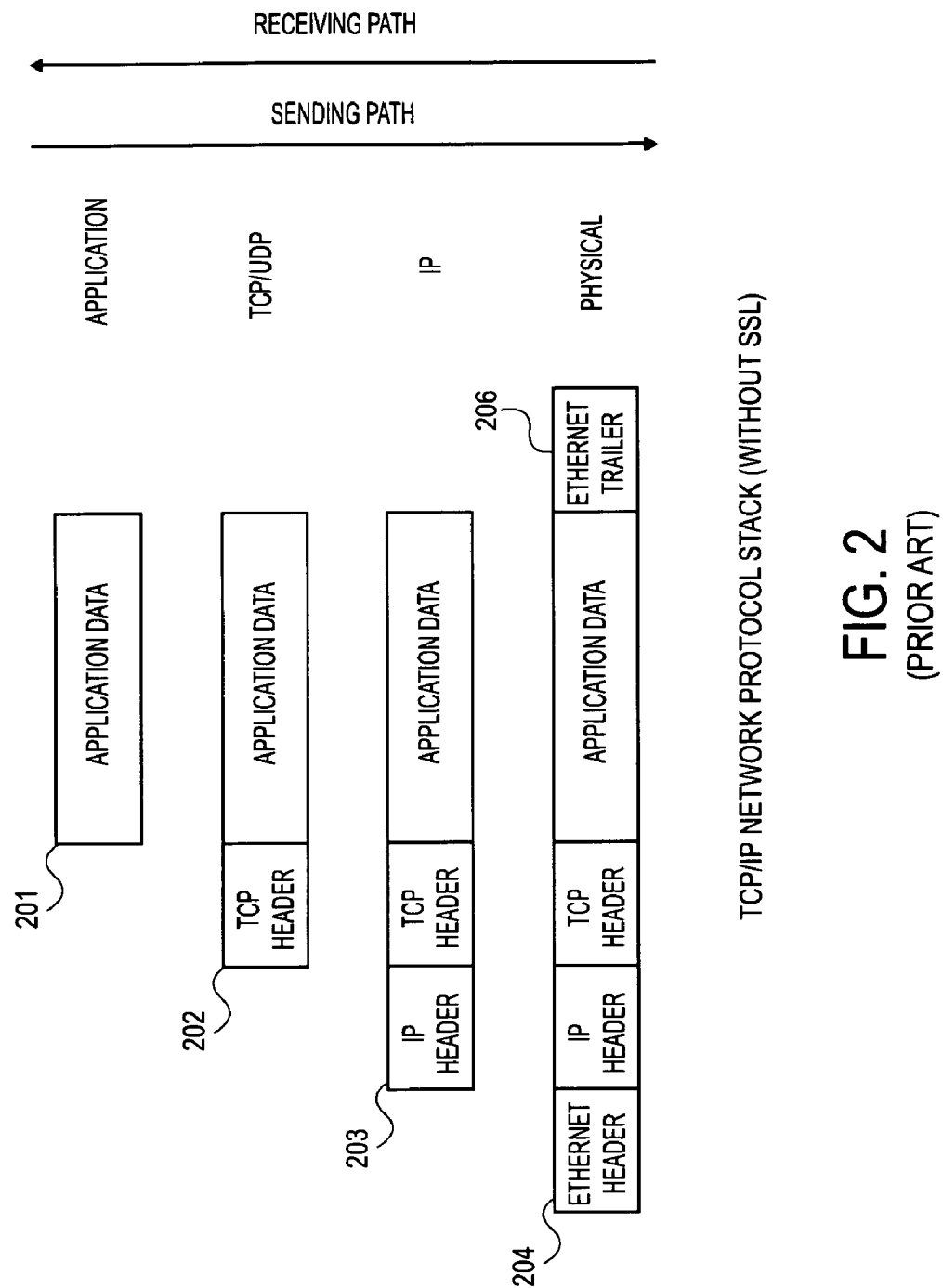
FIG. 2 shows a TCP/IP network protocol stack without SSL.
Figure 3:
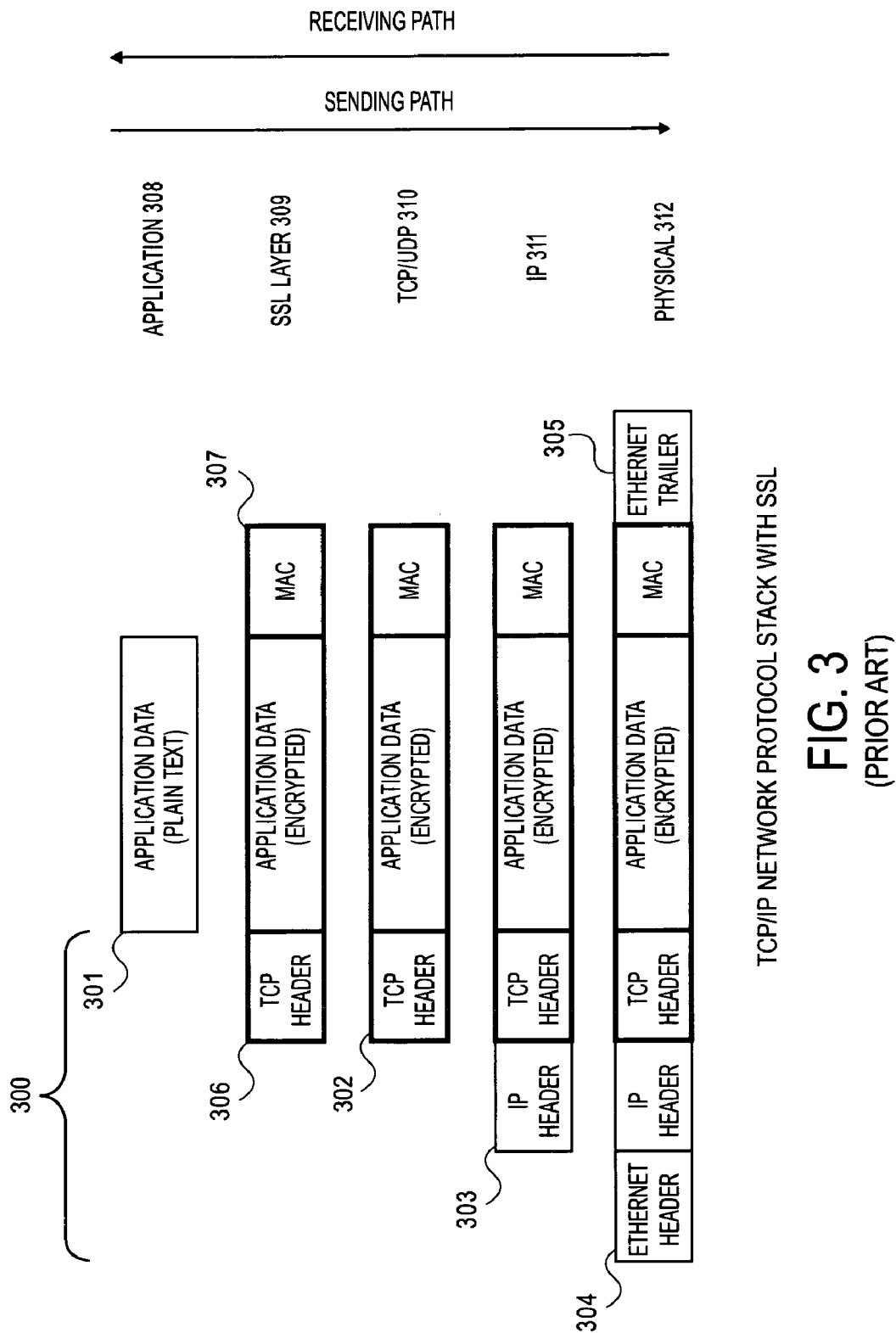
FIG. 3 shows a TCP/IP network protocol stack with SSL.

Referring to FIGS. 3, 6, and 7b, inbound IP packets are received, in operation 701b, by a Network Protocol Offload Chip (NPOC) 600 at the network interface 601. The IP packets are next transferred (e.g., via a Direct Memory Access (DMA)) into a memory location in the NPOC 600, in operation 702b. Such memory could be a Network Offload Memory (NOM) 604 as shown in FIG. 6. Information is transferred directly to and from memory by many devices over DMA channels. The whole DMA operation can run on the background without interfering with the microprocessor's resources. It is useful to note that DMA is efficient for transferring large amounts of data. However, small amounts of data may be transferred in packets without involving DMA operations.

Next, the TCP/IP processors 605 access, in operation 703b, the IP packet header and TCP packet header. The access of operation 703b to perform the necessary TCP/IP processing takes place in the NOM 604. It is important to note that the TCP/IP processing in operation 703b only operates on TCP/IP header of the packet. The content of the packet is untouched and the data still remains encrypted. In the inbound direction, TCP/IP processing includes the removal of IP header 303 at IP layer 311, as well as reassembly, error detection, reordering, and removal of TCP header 302 at TCP layer 310 consistent with the IP and TCP protocols. After TCP/IP processing is completed, only SSL packet 309 portion of the IP packet is remaining in the NOM 604. An SSL packet includes application data 301, SSL header 306 and Message Authentication Code (MAC) 307. At this point, the content of data is still untouched and the data still remains encrypted. The SSL packet could contain only application data, if SSL processing is not required, in which case the data is plain text.

In an alternative embodiment, the host 606 may access the IP packets in NOM 604 and perform TCP/IP processing without copying the IP packets payload to the host memory 607.

After TCP/IP processing, the data is next checked in operation 704b to determine if SSL processing is necessary, based on the information revealed during the TCP/IP processing 703b. One method to determine if SSL processing is necessary is to lookup the TCP packet in the TCP state table to check whether this is a secure connection. If this is a secure connection (e.g., the destination port is 443), SSL processing is required. The TCP table can be maintained either in the software or in the hardware of the NPOC 600. If SSL processing is necessary, the SSL packet is sent in operation 705b to the acceleration device 602. In the inbound direction, SSL processing in operation 706b is the authentication and decryption of the inbound SSL packet. SSL processing results in the removal of SSL header 306 and MAC 307, leaving only the application data. Thereafter, the application data will be transferred (e.g., via Direct Memory Access (DMA)) in operation 707b to the system memory 607 (via the system cpu/chipset 606). If the data is checked in operation 704b and SSL processing is not necessary, the data will be directly transferred through operation 707b to system memory (e.g., via Direct Memory Access (DMA)).

Referring to FIGS. 3, 6, and 7a, outbound IP packets begin as application data within the system memory 607. Upon receiving application data in operation 701a, the host first sends a request to the NPOC 600, indicating it wishes to transfer data. The request may include the information indicating whether SSL processing is required (e.g., whether this is a secure connection). Based on that information, NPOC checks, in operation 703a, whether the data requires SSL processing. If it determines that SSL processing is necessary, NPOC will pass in operation 704a the data to an acceleration device 602.

SSL processing (e.g., encapsulating and encrypting the data with an SSL header 306 and MAC 307) is then performed in operation 705a by the acceleration device 602 on the data that require SSL processing. The SSL packet 309 created as a result of the SSL processing is next transferred in operation 706a to a memory location of NPOC 600. The memory location could be a Network Offload Memory (NOM) 604. If the data checked in operation 703a indicates that SSL processing is not necessary, the data will be directly transferred in operation 706a to NOM 604 (e.g., via Direct Memory Access (DMA)).

Next, TCP/IP processors 605 perform TCP/IP processing in operation 707a on the SSL packets. In the outbound direction, TCP/IP processing is the addition of TCP header 302 at the TCP layer 310 and the addition of IP header 303 at IP layer 311, consistent with TCP and IP protocols. The TCP/IP headers in conjunction with the TCP state table indicate that this is a secured packet as well as the algorithm used for encryption. As a result, the receiving system can determine whether SSL processing is required and what algorithm to use for decryption. In the outbound direction, TCP/IP processing results in the creation of an IP packet. Thereafter, IP packets are transferred to network interface 601 (e.g., via Direct Memory Access (DMA)) in operation 708a for final transmission.

In an alternative embodiment, the host 606 may access the SSL packets in NOM 604 and perform TCP/IP processing without copying the SSL packets payload to the host memory 607.

Figure 8:
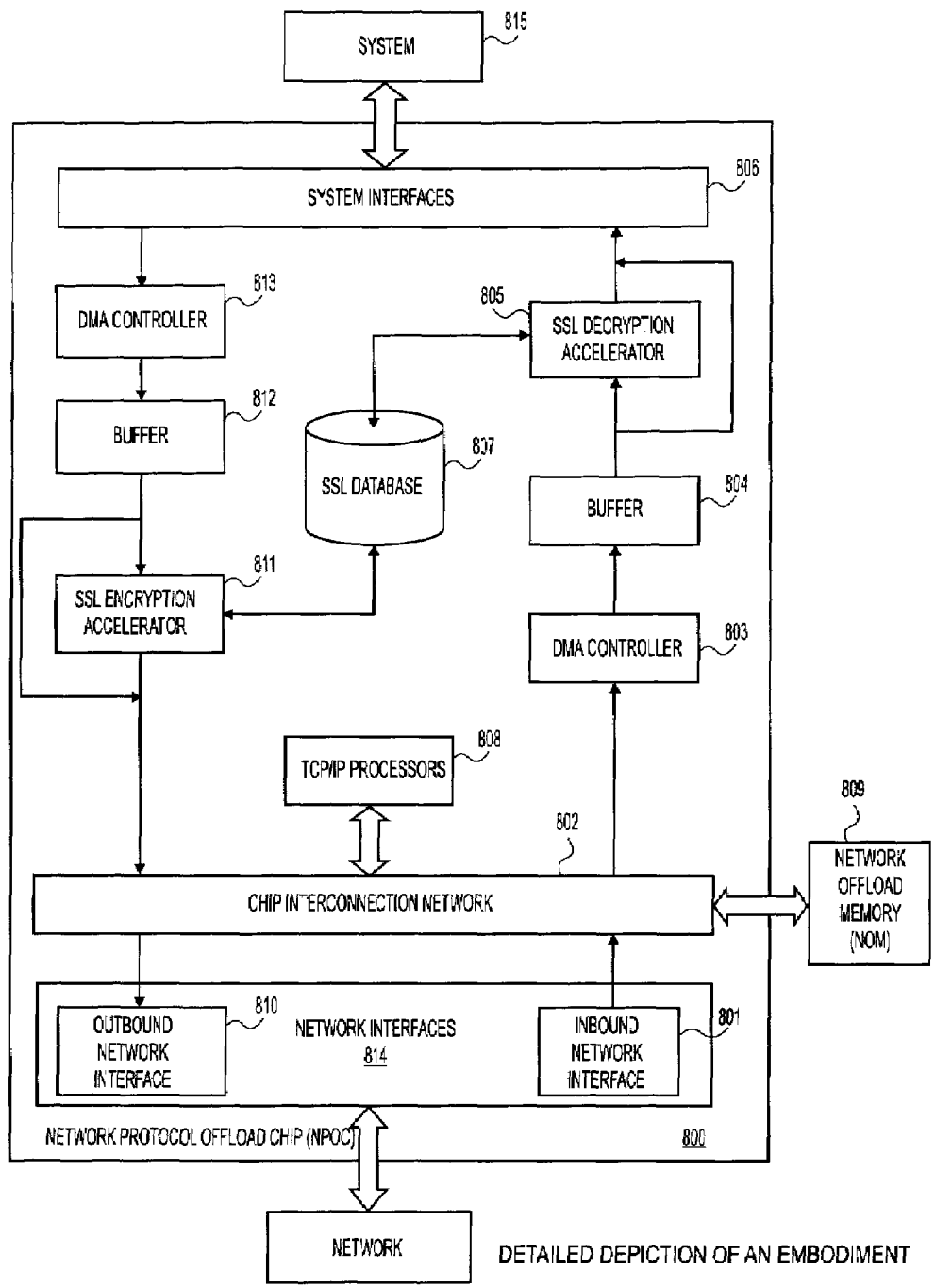
FIG. 8 shows a more detailed depiction of an embodiment of FIG. 6.

A more detailed embodiment of the processing for inbound IP packets requiring SSL processing is shown in FIG. 8. As IP packets are received by the network protocol offload chip's 800 inbound network interface 801, the network interface logic 814 will forward the received packets to Network Offload Memory (NOM) 809 through the chip interconnection network 802. In one embodiment, the packets transferred from inbound network interface 801 to NOM 809 are through Direct Memory Access (DMA) operation, by the DMA controller 803. While FIG. 8 shows the system of FIG. 8 as an integrated circuit ("chip"), it will be appreciated that this system may be implemented as multiple chips.

Next, IP packets in NOM 809 are accessed by the TCP/IP processors 808 for TCP/IP processing. An advantage here is that since TCP/IP processors are contained within the NPOC 800, TCP/IP processors 808 can access IP packets directly (in NOM 809). Thus TCP/IP processing does not need to move or copy the data in memory since the IP packets were copied into a pre-allocated memory buffer (NOM 809) that will be used for TCP/IP processing.

Refer to FIGS. 8, 6, and 3, during TCP/IP processing the IP header 303 and TCP header 302 will be removed. Therefore, only application data or SSL packet (if SSL processing is required) will remain in NOM 809 after TCP/IP processing. The determination can be based on whether the current connection is a secure connection and therefore SSL processing is required can be performed a lookup in the TCP table. The TCP table may be stored in the SSL database, which may exist in the software or in the hardware. In one embodiment, the acceleration device 602 may access the TCP table to determine if SSL processing is required. In an alternate embodiment, TCP/IP processors 808 may access the TCP table determine if SSL processing is necessary. Other components of the system may perform such action. This step can be skipped if it is known to the system that the current connection is a secure connection. If SSL processing is not required, the data will be sent (e.g., through a Direct Memory Access) directly to system memory (e.g., host memory 607).

If SSL processing is required, the SSL decryption accelerator 805 performs SSL processing on the data that require SSL processing. An important point is that SSL decryption accelerator 805 is placed inline in the processing of the received data. In addition, an SSL decryption accelerator may be coupled to SSL database 807. In one embodiment, the SSL database 807 may be a single database or multiple databases for encryption and decryption, and may consist of a single memory chip or multiple memory chips. In another embodiment, an SSL database may be embedded within the decryption acceleration device 805. While processing the data, the decryption accelerator 805 may determine that the data has been corrupted in some fashion. If it has already transferred the data to the host, it must be able to stop the data transferred, by a notification to the host.

The advantage of having an SSL decryption accelerator 805 inline in the processing of an SSL packet is that two memory copies may be eliminated in the SSL processing of inbound SSL packets. This reduction of memory copies will improve overall system performance.

Figure 4:
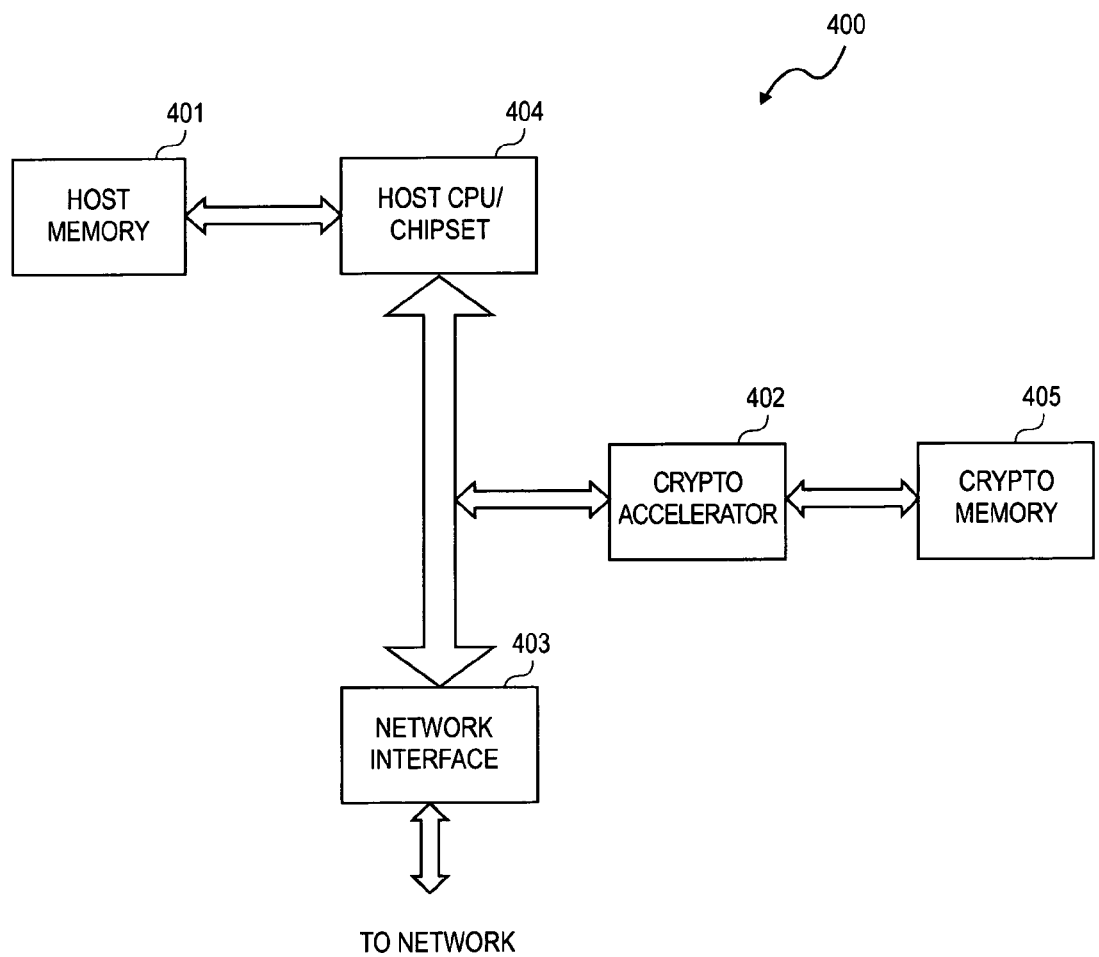
FIG. 4 shows an existing architecture used to perform SSL processing.

Existing or previous embodiments have employed an approach as shown in FIG. 4, in which TCP/IP processing and SSL processing are performed in two distinct modules. IP packets arrive at network interface 403 and are transferred in encrypted form to the host memory 401. The host CPU 404 then performs TCP/IP processing in host memory 401. After TCP/IP processing, host CPU 404 transfers the SSL packet from host memory 401 to the crypto accelerator's 402 memory 405. The decryption accelerator 402 then performs SSL processing on the data in its memory 405. After SSL processing, data will be sent back to host memory 401 and thereafter transferred to application.

The disadvantage of these schemes is the memory bandwidth and system interconnect bandwidth required to move data between its storage location 401 and the cryptographic acceleration device's 402 memory 405 used for SSL processing. For devices with connections to high bandwidth networks, such as a gigabit Ethernet, the system interconnect in the computer system becomes a bottleneck. Referring to FIG. 8, by having the SSL decryption accelerator 805 in line, the two memory copies needed in the alternate embodiment described in FIG. 4 are eliminated. This elimination of memory copies saves bandwidth both on the system bus as well as the chip interconnection network 802.

Referring to FIGS. 3, 7b, and 8, during the SSL processing in operation 706b, the decryption accelerator 805 retrieves the SSL correct information (e.g., an SSL key) from SSL database 807, and decrypts, and authenticates the SSL record. As a result, SSL header 306 and MAC 307 will be removed. Therefore, after SSL processing, only the application data 301 (in plain text form or other format) remains in NOM. Thereafter, the application data 301 will be transferred (via Direct Memory Access) to system memory.

An embodiment of the processing for outgoing IP packets requiring SSL processing is shown in FIG. 8. When the system 815 initiates a data transfer (for an outbound message), it first sends a request to the NPOC 800. The request may indicate this is a secure connection, by specifying a secure destination port (e.g., port 443). Based on this information, the NPOC 800 then determines whether SSL processing is required by accessing an SSL database 807 to determine if there is corresponding SSL process information (e.g., encryption/authentication algorithm) available. In one embodiment, system interface 806 may receive the request from system and performs the checking. In an alternate embodiment, the SSL encryption accelerator 811 may perform the checking. If SSL processing is not required, the application data will be transferred directly (via Direct Memory Access) to Network Offload Memory (NOM) 809.

If SSL processing is required, the application data will be transferred (via Direct Memory Access) from host memory (in system 815) to SSL encryption accelerator 811. Next, the SSL encryption accelerator 811 will perform SSL processing on the application data that require SSL processing. An important point is that the SSL encryption accelerator 811 is placed inline in the processing of the data. In addition, the SSL encryption accelerator 811 is coupled to an SSL database 807. The advantage of having an SSL encryption accelerator 811 inline is that two memory copies may be eliminated in the SSL processing of outbound SSL packets.

Existing or previous embodiments have employed an approach as shown in FIG. 4, in which application data which require SSL processing, are first sent via the host memory 401. The host CPU 404 then dispatches the data and associated control information from the host memory 401 to the crypto accelerator 402 for SSL processing. The crypto accelerator 402 then encrypts the SSL packet and sends it back to host memory 401. Then the TCP/IP processing will be performed on the data in the host memory 401. Thereafter, IP packets are transferred to the network interface 403.

The disadvantage of these schemes is the memory bandwidth and system interconnect bandwidth required to move data between its storage location 401 and the cryptographic accelerator 402 used for SSL processing. For devices with connections to high bandwidth networks, such as a gigabit Ethernet, the system interconnect in the computer system becomes a bottleneck. Referring to FIG. 8, by having the SSL encryption accelerator 811 inline, the two memory copies needed in existing or previous embodiment described in FIG. 4 are eliminated. This elimination of memory copies saves bandwidth both on the system bus as well as the chip interconnect network 802.

After SSL processing, SSL packets will be transferred directly (via Direct Memory Access) to Network Offload Memory (NOM) 809, wherein the TCP/IP processors 808 will perform TCP/IP processing. Thereafter, IP packets will be transferred (via Direct Memory Access) to outbound network interface 810 and out to the network.

Figure 9:
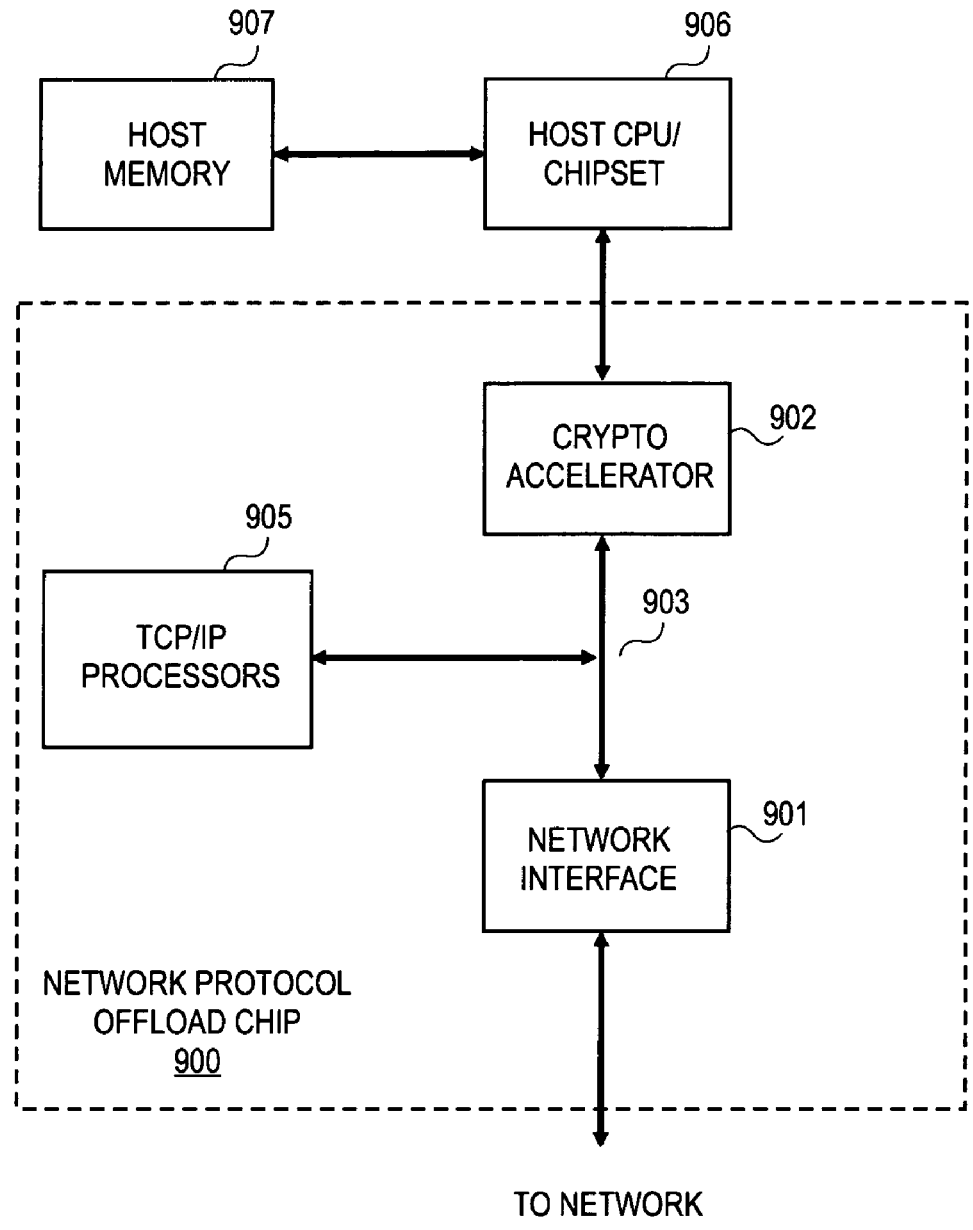
FIG. 9 shows one embodiment of an architecture to perform SSL processing.

FIG. 9 shows another embodiment of architecture for a receiving system or a transmitting system according to one embodiment of the invention. A corresponding embodiment of a method for performing SSL processing on an outbound SSL packet is shown in FIG. 10a. A corresponding embodiment of a method for performing SSL processing on an inbound SSL packet is shown in FIG. 10b.

Refer to FIGS. 9 and 10a, an outgoing data is received, in operation 1001a, at the system interface from the host memory 907 and host cpu/chipset 906. The system then determines, in operation 1002a, whether the SSL processing is required, by looking up the TCP table. In one embodiment, the checking may be skipped, because the host CPU/chipset 906 initiates the data transfer. In order to establish a secure connection, it must request for one (e.g., request for a secure destination port 443). Therefore, the host CPU/chipset 906 can notify NPOC at the initial stages of the transfer, by requesting a secure connection.

If SSL processing is required, the data will be transferred through operation 1003a to the crypto accelerator 902. SSL processing is performed, in operation 1004a, in the crypto accelerator 902. As the result, an SSL packet is created in the crypto accelerator 902. Thereafter, the SSL packet will be transferred to TCP/IP processors 905 for TCP/IP processing. If SSL processing is not required, the data may bypass the accelerator 902 and directly be transferred to TCP/IP processors 905. Next, TCP/IP processing will be performed, in operation 1005a, by the TCP/IP processor 905. In alternative embodiment, host 906 may directly access the SSL packet in NPOC 900 and perform TCP/IP processing on the packet without copying the packet payload to host memory 907. As the result, an IP packet is created and thereafter the IP packet is transferred, in operation 1006a, to the network interface 901 and out to the network.

The incoming data processing goes similarly in reversed order. Refer to FIGS. 9 and 10b, an incoming IP packet is received, in operation 1001b, at the network interface 901. The IP packet is then transferred directly to the TCP/IP processors 905. Next, TCP/IP processing is performed, through operation 1002b by the TCP/IP processors 905. During the TCP/IP processing, TCP/IP processors access the TCP/IP headers of the data and as a result, TCP/IP headers will be removed resulting in an SSL packet. It is important to note that, during the TCP/IP processing, TCP/IP processors only access the headers of the data and contents of the data are still encrypted. TCP/IP processing also reveals the information whether SSL processing is required and what algorithm will be used for SSL processing. In alternative embodiment, host 906 may directly access the IP packet in NPOC 900 and perform TCP/IP processing on the packet without copying the packet payload to host memory 907.

Based on the information revealed during the TCP/IP processing, the system then determines, in operation 1003b, whether SSL processing is required. If SSL processing is required, the SSL packet is transferred to the crypto accelerator 902 through operation 1004b and SSL processing is performed, through operation 1005b, by the crypto accelerator 902. As the result, the SSL packet is decrypted/authenticated, and plain text data is revealed. Then the data will be transferred, in operation 1006b, to the system interface and to the host cpu/chipset 906 and host memory 907. If SSL processing is not required (e.g., plain text), after the TCP/IP processing 1002b, the data may be transferred directly to system interface and to the host cpu/chipset 906 and host memory 907.

It is important to note that the whole SSL processing and TCP/IP processing are performed inline in the NPOC 900 without further involving extra memory copying operations. In another embodiment, there is a small amount of buffering (e.g., buffers 1112) in the crypto accelerator 902 and throughout the NPOC 900. One usage of the buffering is for serialization and rate matching, etc. It will be appreciated that there is a buffer or buffers existed between each stage of data processing through out the system.

Figure 11:
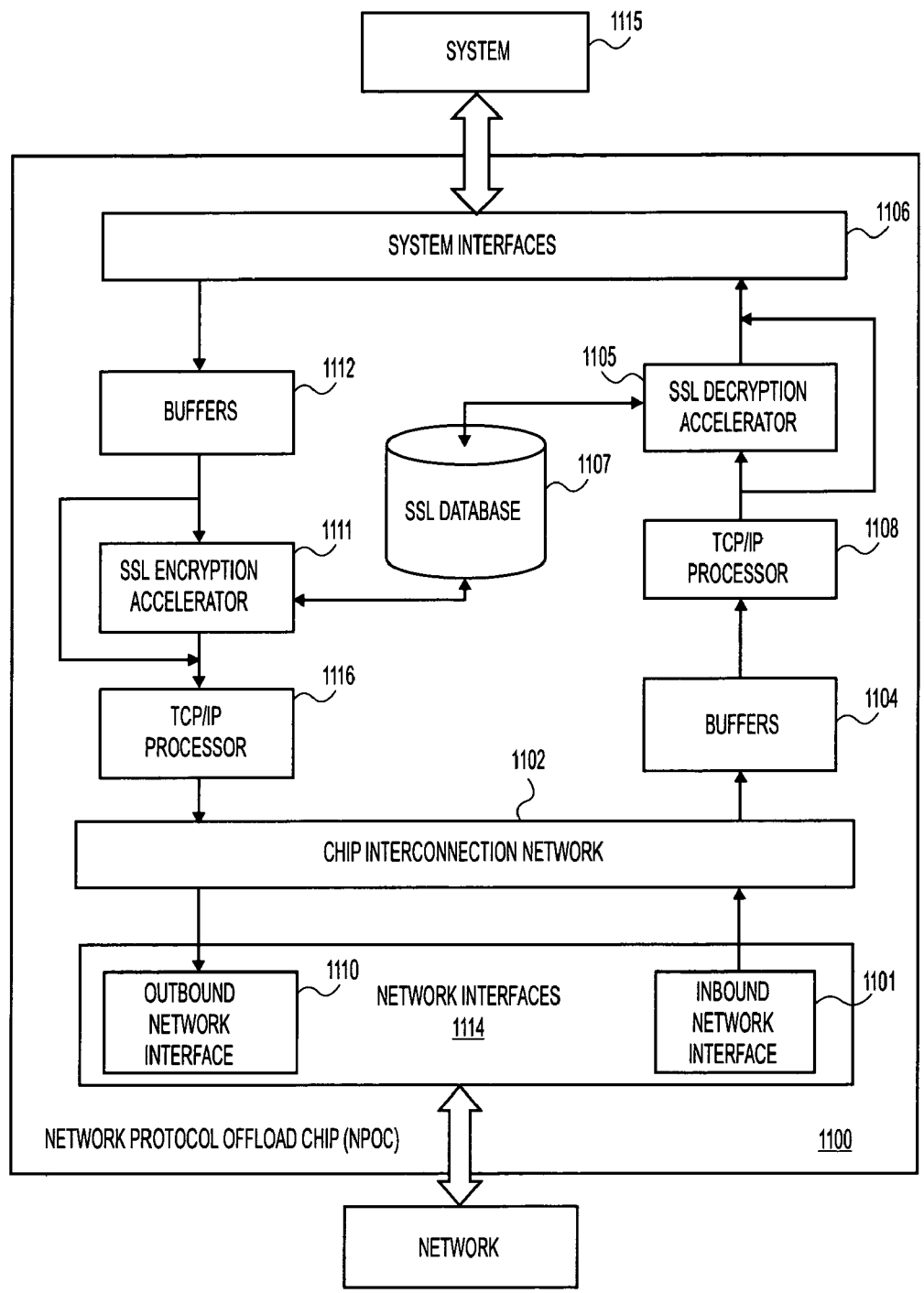
FIG. 11 shows a more detailed depiction of an embodiment of FIG. 9.

A more detailed embodiment of the processing for inbound IP packets requiring SSL processing is shown in FIG. 11. As IP packets are received by the network protocol offload chip's 1100 inbound network interface 1101 network interface logic 1114 will forward the received packets to TCP/IP processor 1108 through chip interconnection network 1102. While FIG. 11 shows the system of FIG. 11 as an integrated circuit ("chip"), it will be appreciated that this system may be implemented as multiple chips.

Next, TCP/IP processor 1108 accesses the TCP/IP headers of the IP packet and performs TCP/IP processing on the IP packet. An advantage here is that since TCP/IP processors are built inline with NPOC 1100, TCP/IP processors can access IP packets directly. Thus TCP/IP processing does not need to move or copy the data in memory since the IP packets were forwarded into the TCP/IP processor 1108 which will be used for TCP/IP processing.

In an alternative embodiment, TCP/IP accesses the IP packets at the inbound network interface 1101 and performs TCP/IP processing on the IP packets. In a further alternative embodiment, IP packets may be transferred to a temporary buffer (e.g., buffers 1104). Then TCP/IP processor 1108 accesses the IP packets in the temporary buffer and performs TCP/IP processing. Other mechanisms may be available to achieve the similar results.

Refer to FIGS. 11, 6, and 3, during TCP/IP processing the IP header 303 and TCP header 302 will be removed. Therefore, only application data or SSL packet (if SSL processing is required) will remain after TCP/IP processing. The determination on whether the current connection is a secure connection and therefore SSL processing is required can be performed a lookup in the TCP table. The TCP table may be stored in the SSL database, in the software, or in the hardware. In one embodiment, TCP/IP processor 1108 may access the TCP table to determine if SSL processing is necessary. TCP/IP processor 1108 may also determine if SSL processing is required based on the information revealed from the TCP/IP headers during the TCP/IP processing. Other components of the system may perform such action. This step can be skipped if it is known to the system that the current connection is a secure connection. If SSL processing is not required, the data will be transferred directly to system memory (e.g., host memory 607).

If SSL processing is required, the SSL packet will be transferred to decryption accelerator 1105 and the SSL decryption accelerator 1105 performs SSL processing on the data that require SSL processing. An important point is that SSL decryption accelerator 1105 is placed inline in the processing of the received data. In addition, an SSL decryption accelerator 1105 may be coupled to SSL database 1107. In one embodiment, the SSL database 1107 may be a single database or multiple databases for encryption and decryption, and may consist of a single memory chip or multiple memory chips. In another embodiment, an SSL database may be embedded within the decryption acceleration device 1105. While processing the data, the decryption accelerator 1105 may determine that the data has been corrupted in some fashion. If it has already transferred the data to the host, it must be able to stop the data transferred, by a notification to the host.

The advantage of having an SSL decryption accelerator 1105 inline in the processing of an SSL packet is that two memory copies required by a conventional SSL processing may be eliminated. This reduction of memory copies will improve overall system performance.

Referring to FIGS. 3, 10b, and 11, during the SSL processing in operation 1005b, the decryption accelerator 1105 retrieves the SSL correct information (e.g., an SSL key) from SSL database 1107, and decrypts, and authenticates the SSL record. As a result, SSL header 306 and MAC 307 will be removed. Therefore, after SSL processing operation 1005b, only the application data 301 (in plain text form or other format) remains in accelerator 1105. Thereafter, the application data 301 will be transferred to the system memory.

A detailed embodiment of the processing for outgoing IP packets requiring SSL processing is shown in FIG. 11. When the system CPU 1115 initiates a data transfer, it sends a request for secure connection (e.g., specifying a secure port 443), the system interface 1106 performs the checking whether SSL processing is required, by determining whether host system 1115 requests for a secure connection. Other components of the system may perform such action.

If SSL processing is required, the system interface 1106 forwards the data to the encryption accelerator 1111 and the encryption accelerator 1111 performs SSL processing. As a result, SSL packet is created. Next, the SSL packet is transferred to TCP/IP processor 1116 and TCP/IP processor 1116 performs the TCP/IP processing. An important point is that the SSL encryption accelerator 1111 is placed inline in the processing of the data. In addition, the SSL encryption accelerator 1111 is coupled to an SSL database 1107. The advantage of having an SSL encryption accelerator 1111 inline is that two memory copies required by a conventional SSL processing may be eliminated. This reduction of memory copies will improve overall system performance.

If SSL processing is not required, system interface 1106 will transfer the data directly to TCP/IP processor 1116 and TCP/IP processor 1116 will perform TCP/IP processing directly on the data. As a result, an IP packet is created. Thereafter, the IP packet will be transferred to outbound network interface 1110 and out to the network.

In an alternative embodiment, if SSL processing is not required, TCP/IP processor 1116 performs TCP/IP processing on the data at the system interface 1106. In a further alternative embodiment, if SSL processing is not required, the data may be transferred directly to the outbound network interface 1110 wherein TCP/IP processing is performed. Furthermore, the data may be transferred to a temporary buffer (e.g., buffers 1112), wherein the checking and TCP/IP processing may be performed. Other mechanisms may be available to achieve the similar results.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computing system, comprising:
    a central processing unit;
    a host memory coupled to said central processing unit, said host memory storing instructions executed by said central processing unit and data operated upon by way of said central processing unit executing said instructions;
    a network interface receiving inbound IP packets and sending outbound IP packets;
    an offload processing subsystem, said offload processing subsystem communicatively coupled to said central processing unit and said network interface, said offload processing subsystem comprising:
    a) TCP/IP logic circuitry processing TCP/IP tasks on said inbound and outbound IP packets without using said central processing unit and said host memory;
    b) SSL decryption logic circuitry processing SSL tasks on said inbound IP packets without using said central processing unit and said host memory;
    c) SSL encryption logic circuitry processing SSL tasks on said outbound IP packets without using said central processing unit and said host memory;
    d) a storage resource comprising one or more memory chips coupled to both said SSL decryption logic circuitry and said SSL encryption logic circuitry, said storage resource storing SSL processing information;
    e) an offload memory coupled to said TCP/IP logic circuitry, said offload memory storing said inbound and outbound TCP/IP packets, said network interface coupled to said offload memory;
    f) a first direct memory access (DMA) controller retrieving said inbound IP packets from said offload memory, said first DMA controller coupled to said SSL decryption logic circuitry;
    g) a second direct memory access (DMA) controller retrieving said outbound IP packets from said host memory, said second DMA controller coupled to said SSL encryption logic circuitry.

2. The computing system as in claim 1 wherein said inbound network interface comprises an Ethernet interface.

3. The computing system as in claim 1 comprising a first buffer downstream from an output of said first DMA controller and upstream from an input of said SSL decryption logic circuitry, and, a second buffer downstream from an output of said second DMA controller and upstream from an input of said SSL encryption logic circuitry.

* * * * *